United States Patent
Kong et al.

(10) Patent No.: US 8,306,738 B2
(45) Date of Patent: Nov. 6, 2012

(54) APPARATUS AND METHOD FOR BUILDING MAP

(75) Inventors: Dong-Geon Kong, Yongin-si (KR); Hyoung-Ki Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 789 days.

(21) Appl. No.: 12/382,187

(22) Filed: Mar. 10, 2009

(65) Prior Publication Data

US 2010/0070078 A1    Mar. 18, 2010

(30) Foreign Application Priority Data

Sep. 16, 2008  (KR) .................. 10-2008-0090727

(51) Int. Cl.
*B25J 13/08*    (2006.01)
*B25J 5/00*    (2006.01)
*G06F 19/00*    (2011.01)
*B25J 13/00*    (2006.01)

(52) U.S. Cl. ........ 701/411; 700/245; 700/259; 701/300; 701/446; 701/450; 701/518; 701/523; 901/1; 901/47

(58) Field of Classification Search .......... 700/245–264; 701/300–541; 901/1, 47
See application file for complete search history.

(56) References Cited

U.S. PATENT DOCUMENTS

| | | | |
|---|---|---|---|
| 6,278,917 B1 | 8/2001 | Bauer et al. | |
| 2005/0000543 A1* | 1/2005 | Taylor et al. | ................... 134/18 |
| 2005/0046373 A1* | 3/2005 | Aldred | ........................ 318/580 |
| 2006/0012493 A1* | 1/2006 | Karlsson et al. | ......... 340/995.24 |
| 2008/0009968 A1* | 1/2008 | Bruemmer et al. | ........... 700/245 |

FOREIGN PATENT DOCUMENTS

| | | |
|---|---|---|
| JP | 10-143243 | 5/1998 |
| JP | 2004-33340 | 2/2004 |
| JP | 2005-32196 | 2/2005 |
| JP | 2005-211367 | 8/2005 |
| KR | 1995-0005403 | 5/1995 |
| KR | 10-2007-0026912 | 3/2007 |

* cited by examiner

*Primary Examiner* — Khoi Tran
*Assistant Examiner* — Dale Moyer
(74) *Attorney, Agent, or Firm* — Staas & Halsey LLP

(57) ABSTRACT

An apparatus and method for building a map are provided. According to the apparatus and method, a path is generated on the basis of the degrees of uncertainty of features extracted from an image obtained while a mobile robot explores unknown surroundings, and the mobile robot travels along the generated path. The path based on the degrees of uncertainty of the features is generated and this may increase the accuracy of a feature map of the mobile robot or accuracy in self localization.

19 Claims, 6 Drawing Sheets

DIVIDE OBSTACLE MAP SPACE INTO EIGHT REGIONS

CALCULATE AVERAGE POSITION
OF FEATURES IN EACH REGION

GENERATE OBSTACLE AVOIDANCE PATH
PASSING THROUGH AVERAGE POSITIONS

APPARATUS AND METHOD FOR BUILDING MAP

CROSS-REFERENCE TO RELATED APPLICATIONS

This application claims priority from Korean Patent Application No. 10-2008-0090727, filed on Sep. 16, 2008, the disclosure of which is incorporated herein in its entirety by reference.

BACKGROUND

1. Field

One or more embodiments within the following description relate to an apparatus and method for building a map, and more particularly, to an apparatus and method for accurately building a map of unknown surroundings.

2. Description of the Related Art

The most fundamental function of an autonomous mobile robot is to move to a destination without collision. This function is achieved using a localization technique and a mapping technique performed by the autonomous mobile robot. The autonomous mobile robot uses a simultaneous localization and mapping (SLAM) algorithm to localize itself and build a map. According to the SLAM algorithm, a process of building a map of the surroundings at some position and localizing a robot on the basis of the built map is repeated to simultaneously estimate the position of the robot and relative positions of the robot's surroundings.

To build a map, a mobile robot generally measures a distance using a laser scanner or camera and an odometer. However, errors accumulate when the SLAM algorithm is executed due to a variety of unpredictable factors such as a feature extraction error, an unknown odometry error, and a camera geometry error.

SUMMARY

According to one or more embodiments, an apparatus and method for accurately and rapidly building an obstacle map and feature map of unknown surroundings by controlling a path of a mobile robot is provided.

Additional aspects and/or advantages will be set forth in part in the description which follows and, in part, will be apparent from the description, or may be learned by practice of the invention.

According to an embodiment, an apparatus for building a map is provided. The apparatus includes: an obstacle map builder for building an obstacle map on the basis of obtained obstacle detection information; a controller for building a feature map including a plurality of features, position information of the features, and information regarding degrees of uncertainty of the features on the basis of an amount of change in posture and an image obtained while a mobile robot moves, and localizing the mobile robot itself; a path generator for generating a moving path on the basis of the degrees of uncertainty of the features obtained by the mobile robot; and a drive controller for controlling the mobile robot to travel along the generated moving path. Here, the feature map and the obstacle map are updated on the basis of the amount of change in posture, the image and the obstacle detection information obtained while the mobile robot travels along the generated moving path.

The path generator may generate at least one of an exploration path for reducing the degrees of uncertainty of the features and a self-localization enhancement path for reducing a degree of uncertainty of a position of the mobile robot, on the basis of the degrees of uncertainty of the features.

The path generator may search for features having a degree of uncertainty of a first threshold value or more among the features and generate the exploration path including positions of the searched features as intermediate path points and extending from a current position to a destination. The destination may be a point between an unknown region and an empty region having no obstacles in the obstacle map being built.

When there are a plurality of features having a degree of uncertainty of the first threshold value or more among the features, the path generator may divide a space in which the features having a degree of uncertainty of the first threshold value or more exist into two or more spaces and generate the exploration path including average positions of the features existing in the respective divided spaces as intermediate path points and extending from the current position to the destination.

When a Kalman filter is used to estimate positions of the features, the controller may calculate the degrees of uncertainty of the features using an error covariance matrix. The controller may extract features from an image obtained while the mobile robot travels along the exploration path, search the feature map for features matching the extracted features, and update position information of the searched features.

When it is determined that a degree of uncertainty of a current position of the mobile robot is a second threshold value or more, the path generator may search for features having a smaller degree of uncertainty than a third threshold value and generate a closed path, as the self-localization enhancement path, including positions of the searched features as intermediate path points and having the current position as a destination. When a Kalman filter is used to estimate the current position of the mobile robot, the controller may calculate the degree of uncertainty of the current position using a covariance of the estimated current position. When a particle filter is used to estimate the current position of the mobile robot, the controller may calculate variances of particles, which are samples indicating virtual positions of the mobile robot, with respect to an average position of the particles and calculate the degrees of uncertainty of the current position of the mobile robot on the basis of the calculated variances.

The controller may update the current position using position information obtained while the mobile robot travels along the closed path.

When a degree of uncertainty of a position of the mobile robot is a second threshold value or more while the mobile robot travels along the exploration path, the path generator may stop the exploration path travel, generate the self-localization enhancement path for reducing a degree of uncertainty of a position of the mobile robot, control the drive controller such that the mobile robot travels along the self-localization enhancement path, and control the drive controller such that the mobile robot resumes the stopped exploration path travel when the mobile robot travels along the self-localization enhancement path and a degree of uncertainty of a position of the mobile robot decreases.

According to another embodiment, a method of building a map is provided. The method includes: building an obstacle map of a mobile robot on the basis of obtained obstacle detection information; building a feature map including a plurality of features, position information of the features, and information regarding degrees of uncertainty of the features on the basis of an amount of change in posture and an image obtained while the mobile robot moves; generating a moving path on the basis of the degrees of uncertainty of the features obtained by the mobile robot; and traveling along the generated moving path. Here, the feature map and the obstacle map are updated on the basis of the amount of change in posture, the image and the obstacle detection information obtained while the mobile robot travels along the generated moving path.

It is to be understood that both the preceding general description and the following detailed description are exemplary and explanatory and are intended to provide further explanation of the invention as claimed.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
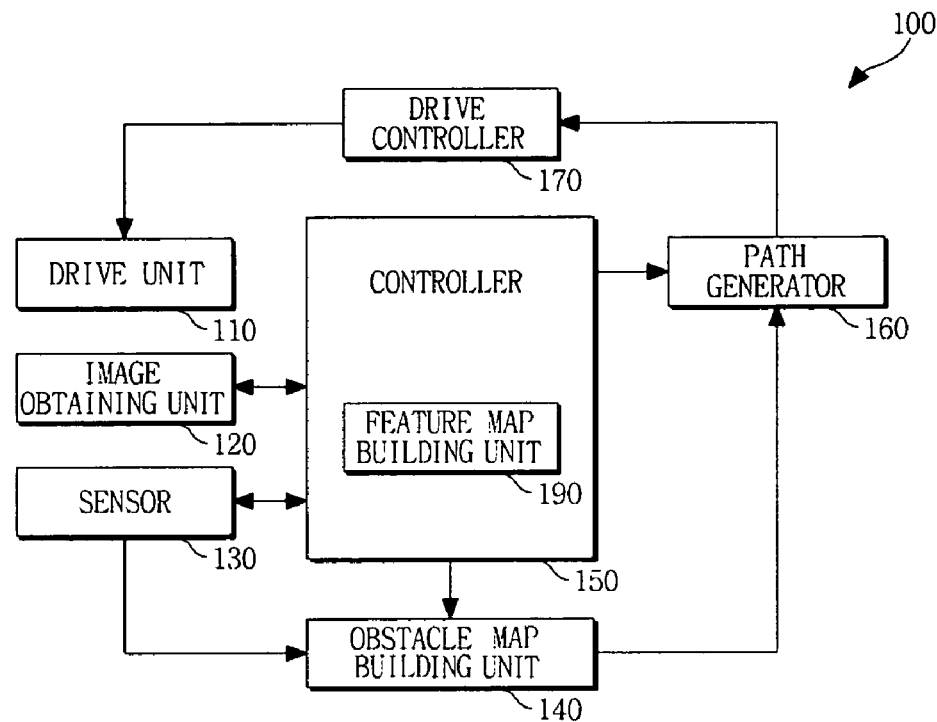
FIG. 1 illustrates an apparatus for building a map, according to an exemplary embodiment.

Reference will now be made in detail to embodiments, examples of which are illustrated in the accompanying drawings, wherein like reference numerals refer to the like elements throughout. Embodiments are described below to explain the present invention by referring to the figures. In the drawings, the sizes and relative sizes of layers and regions may be exaggerated for clarity.

FIG. 1 illustrates an apparatus for building a map, according to an exemplary embodiment.

An apparatus 100 for building a map, according to an exemplary embodiment, may include, for example, a drive unit 110, an image obtainer 120, a sensor 130, an obstacle map builder 140, a controller 150, a moving path generator 160, and a drive controller 170. The present embodiment is based on the assumption that the apparatus 100 is a mobile robot building a feature map and an obstacle map in unknown surroundings, as will be described in more detail below.

The drive unit 110 may include a driving system, such as a plurality of wheels, for driving the mobile robot 100 and a driving source for providing driving power to the driving system.

The image obtainer 120 captures an external image and converts the captured image into a digital signal. The image obtainer 120 may include a charge coupled device (CCD) module or complementary metal-oxide semiconductor (CMOS) module.

The sensor 130 is installed in the mobile robot 100 and senses the amounts of movement and turning of the mobile robot 100. To this end, the sensor 130 may include an encoder or a gyro-sensor, or both. For example, the encoder integrates a moved distance and direction to estimate the current position and heading angle of the mobile robot 100 in a two-dimensional coordinate space. In general, encoders are accurate in integrating short sections, but errors accumulate as the integration operation continues. Meanwhile, the sensor 130 may include an infrared, laser or ultrasonic sensor to sense a distance to an obstacle.

The position and heading angle of the departing mobile robot 100 may be set as reference values. A reference for the posture of the mobile robot 100 may be a feature existing on a map. Thus, the posture of the mobile robot 100 denotes the position and heading angle of the mobile robot 100 with reference to a feature recognized by the mobile robot 100.

Here, a feature is a location at which a shape, such as an edge or corner of an object, can be specified. Features are the basis of map building and are also referred to as landmarks. In addition, a feature may be a line or point extracted from the outline of a closed region. For example, a line or point may be extracted from the circular or quadrangular outline of a light or lighting device, etc., in an image of an indoor ceiling and used as a feature.

The controller 150 controls the overall operation of the mobile robot 100 by controlling data transmission and reception between the components of the mobile robot 100. In addition, the controller 150 performs map building and localizing itself. According to an exemplary embodiment, the controller 150 may perform a simultaneous localization and mapping (SLAM) algorithm in which a process of building a map of surroundings and localizing a moved robot on the basis of the built map is repeated to simultaneously estimate the position of the robot and a map of surroundings, and may perform feature map building and localization. The controller 150 may include a feature map builder 190 for processing feature information and building a feature map.

On the basis of the amount of change in posture and images obtained while the mobile robot 100 travels along a moving path, the feature map builder 190 builds a feature map including a plurality of features, position information of the features, and information regarding the degrees of uncertainty of the respective features. When a Kalman filter is used to estimate the positions of the respective features, the feature map builder 190 may calculate the degrees of uncertainty of the features using an error covariance matrix. Besides this, various methods may be used to determine the degrees of uncertainty of the features.

According to an exemplary embodiment, the feature map builder 190 may calculate the degrees of uncertainty of the features and also the degree of uncertainty of the current position of the mobile robot 100 and transfer the calculated results to the path generator 160. The feature map builder 190 may calculate the degree of uncertainty of the current position using the covariance of the estimated current position. In addition, when a particle filter is used to estimate the current position of the mobile robot 100, the feature map builder 190 may calculate the degrees of uncertainty of the current position using the variances of respective particles with respect to the average position of the particles.

The obstacle map builder 140 builds an obstacle map on the basis of obtained obstacle detection information (or an obstacle detection sensor value). In general, the obstacle map is referred to as a grid map or a probability grid map. In the obstacle map, surroundings of the mobile robot 100 are divided into small grids, and the probability of there being an object in each grid is expressed. The obstacle map builder 140 may build the obstacle map using the position (or posture) of the mobile robot 100 that the controller 150 estimates by performing SLAM and obstacle detection information of the sensor 130.

The path generator 160 may generate an obstacle avoidance path on the basis of the obstacle map built by the obstacle map builder 140. The path generator 160 may generate the path using, for example, an A-star algorithm whereby a path to a destination in an obstacle map is generated.

According to an exemplary embodiment, the path generator 160 may generate a moving path on the basis of the degrees of uncertainty of features obtained by the mobile robot 100. On the basis of the degrees of uncertainty of features, the path generator 160 may generate at least one of an exploration path for reducing the degrees of uncertainty of the features and a self-localization enhancement path for reducing the degree of uncertainty of the position of the mobile robot 100.

To increase the accuracy of the feature map, the path generator 160 searches for features having a degree of uncertainty of a first threshold value or more among the features and generates the exploration path which includes the positions of the searched features as intermediate path points and extends from the current position to a destination. Here, the first threshold value may be a specific reference value whereby the position of each feature is determined to be uncertain or not. In addition, the destination may be a point between an unknown region and an empty region having no obstacles in the obstacle map being built.

Furthermore, when the degree of uncertainty of the current position of the mobile robot 100 is a second threshold value or more, the path generator 160 may search for features having a smaller degree of uncertainty than a third threshold value and generate a closed path, as the self-localization enhancement path, including positions of the searched features as intermediate path points and having the current position as a destination. Here, the second threshold value may be a specific value whereby the current estimated position of the mobile robot 100 is determined to be uncertain or not, and the third threshold value may be a specific value whereby the degree of uncertainty of each feature is determined to be low or not.

When the degree of uncertainty of the position of the mobile robot 100 becomes a specific threshold value or more while the mobile robot 100 is traveling along the exploration path, the path generator 160 may stop the exploration path travel, generate a self-localization enhancement path for reducing the degree of uncertainty of the position of the mobile robot 100, and control the drive controller 170 such that the mobile robot 100 travels along the self-localization enhancement path. When the mobile robot 100 travels along the self-localization enhancement path and the degree of uncertainty of the position of the mobile robot 100 decreases, the path generator 160 may control the drive controller 170 such that the mobile robot 100 resumes the stopped exploration path travel.

The drive controller 170 controls the drive unit 110 such that the mobile robot 100 travels along a generated moving path. The drive controller 170 may control the drive unit 110 such that the mobile robot 100 travels along a path generated by the path generator 160. The feature map and the obstacle map may be updated on the basis of the amount of change in posture, images and obstacle detection information obtained while the mobile robot 100 travels along the generated path.

According to an exemplary embodiment, the feature map builder 190 extracts features from images obtained while the mobile robot 100 travels along a moving path, searches a feature map for features matching the extracted features, and updates the position information of the searched features, thereby updating the feature map. In addition, the obstacle map builder 140 may update the obstacle map using information on an obstacle detected on the basis of the updated position information of the mobile robot 100.

In this exemplary embodiment, it is possible to accurately and rapidly build an obstacle map and feature map of unknown surroundings by controlling the path of the mobile robot 100.

Figure 2:
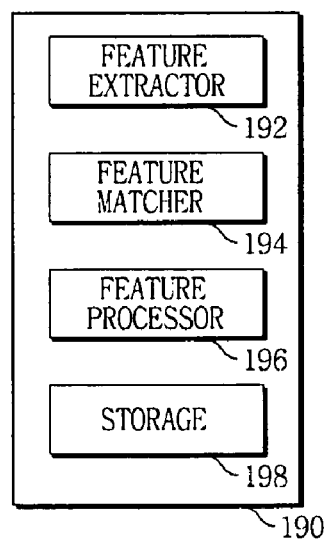
FIG. 2 illustrates a feature map builder of the apparatus for building a map shown in FIG. 1.

FIG. 2 illustrates the feature map builder 190 of the apparatus 100 for building a map shown in FIG. 1.

The feature map builder 190 may include, for example, a feature extractor 192, a feature matcher 194, a feature processor 196, and a storage 198.

The feature extractor 192 extracts features from an obtained image. The feature extractor 192 may extract the features and generate feature descriptors whereby the respective features can be distinguished from each other using various feature extraction algorithms, such as scale-invariant feature transform (SIFT), maximally stable extremal region (MSER), or Harris corner detector.

The feature matcher 194 compares features (current features) extracted from an image obtained after the mobile robot 100 moves with previous features stored in the storage 198 and searches for matching features. Feature matching may be performed by comparing the feature descriptors of respective features.

When it is determined that features extracted at the current time t are the same as features extracted at a previous time t-1, the feature processor 196 updates the positions of the previous features using the currently extracted features and stores other features in the storage 198 as new features. In addition, the feature processor 196 calculates the degrees of uncertainty of the positions of the respective features.

The degrees of uncertainty of the positions of the features may be calculated using, for example, an error covariance matrix of the Kalman filter as illustrated in Equation 1 below:

$$P_{feature} = \begin{pmatrix} P_{xx} & P_{xy} & P_{xz} \\ P_{yx} & P_{yy} & P_{yz} \\ P_{zx} & P_{zy} & P_{zz} \end{pmatrix} \quad \text{Equation 1}$$

When the Kalman filter is used, a probability of a feature being at a specific position may be assumed to have Gaussian distribution. In Equation 1, $P_{xx}$ denotes the covariance of a feature with respect to an x-axis, $P_{yy}$ denotes the covariance of the feature with respect to a y-axis, and $P_{zz}$ denotes the covariance of the feature with respect to a z-axis. $P_{xy}$ denotes the correlation coefficient of the feature with respect to the x-axis and y-axis.

In this case, the degree of uncertainty of the position of a feature may be determined by the following Equation 2 using the main diagonal element of the error covariance matrix of the Kalman filter as illustrated in Equation 2 below:

$$\sigma_{feature} = \frac{(P_{xx} + P_{yy} + P_{zz})}{3} \quad \text{Equation 2}$$

However, the degree of uncertainty of the position of a feature may be determined using $P_{zz}$ considering that the degree of uncertainty of a z-axis coordinate is the highest, and various equations may also be employed.

Meanwhile, the degree of uncertainty of the current position of the mobile robot 100 may be calculated using a method similar to the above-described method of calculating the degree of uncertainty of the position of a feature using the error covariance matrix of the Kalman filter. According to an exemplary embodiment, when the current position of the mobile robot 100 and features are processed using an extended Kalman filter, the covariance of an estimated position of the mobile robot 100 and the covariance of the position of each feature may be derived from an error covariance matrix generated by operation of the extended Kalman filter.

Figure 3:
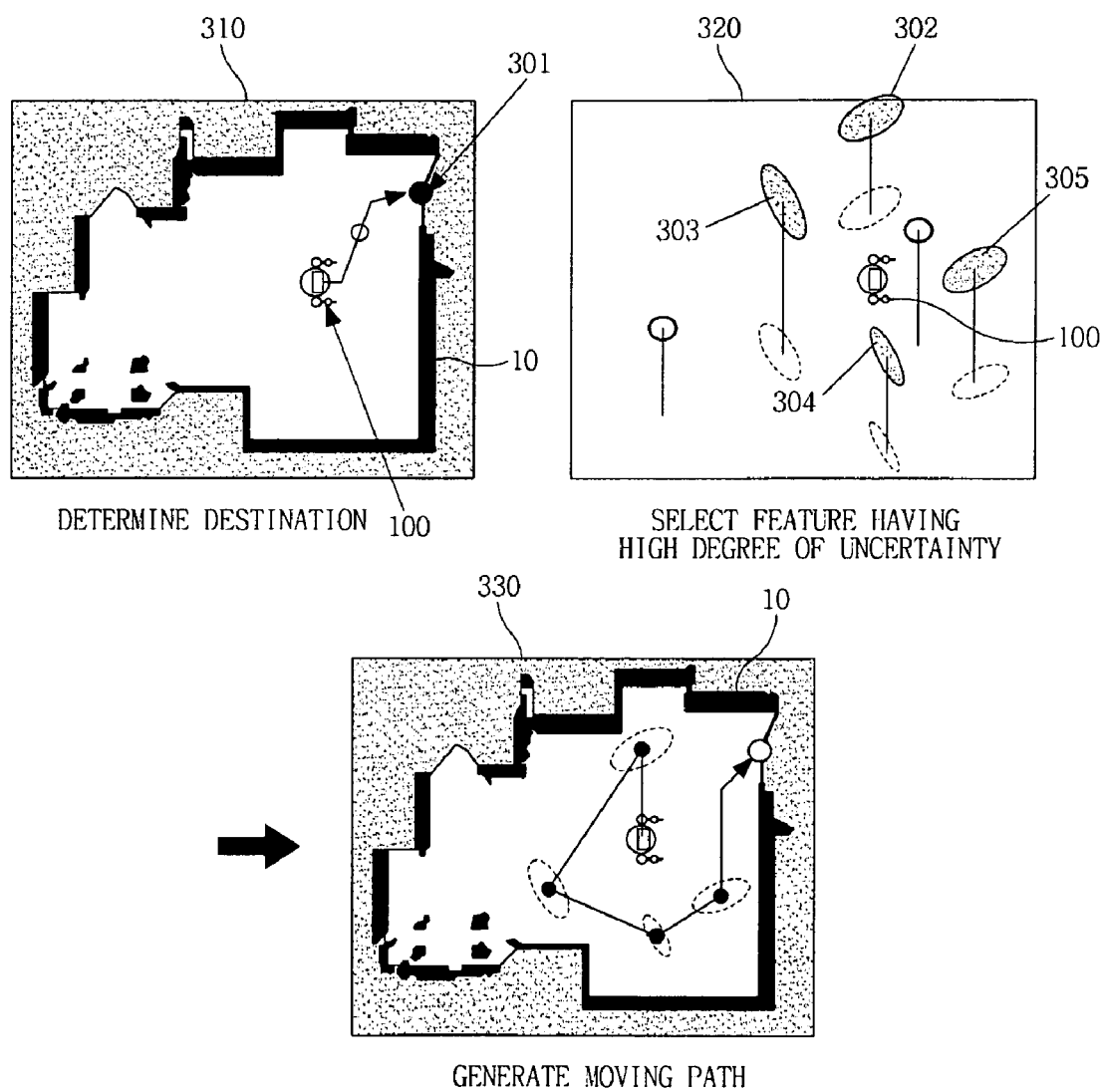
FIG. 3 illustrates a path generation method for improving the accuracy of a feature map, according to an exemplary embodiment.

FIG. 3 illustrates a path generation method for improving the accuracy of a feature map, according to an exemplary embodiment.

The current position of a mobile robot 100 is shown in a space 310 of an obstacle map 10. As shown in the space 310, the mobile robot 100 building a map determines a destination 301. The destination 301 may be a point between an unknown region and an empty region having no obstacles in the obstacle map 10 being built. After, the mobile robot 100 shown in a space 320 searches for features 302, 303, 304 and 305 having a degree of uncertainty of a first threshold value or more among features registered in a feature map. As shown in a space 330, the mobile robot 100 generates an exploration path which includes the positions, e.g., positions in a two-dimensional space in which the mobile robot moves, of the searched features 302, 303, 304 and 305 as intermediate path points and extends from the current position to the destination.

Then, the mobile robot 100 may extract features from images obtained while traveling along the exploration path, search the feature map for features matching the extracted features, and update the position information of the searched features. In other words, it is possible to update the position information of features using the position information of the mobile robot 100 which is estimated using previously registered position information of the features and the currently extracted features. If the mobile robot 100 travels along the exploration path when the degree of uncertainty of the position of the mobile robot 100 is low, the degrees of uncertainty of features decrease and accurate positions of the features can be obtained. This is because a distance can be estimated on the basis of movement of a mobile robot and a plurality of camera images while distance information cannot be obtained from a single camera image.

In this exemplary embodiment, while a mobile robot is traveling along a path according to an exemplary embodiment, it improves the accuracy of features and simultaneously builds a feature map. Thus, it is possible to accurately and efficiently build a feature map. In addition, a mobile robot builds an obstacle map, which is the basis of generating a moving path, using its position information accurately estimated on the basis of an accurate feature map as described above. Thus, the accuracy of the obstacle map also can be increased.

Figure 4:
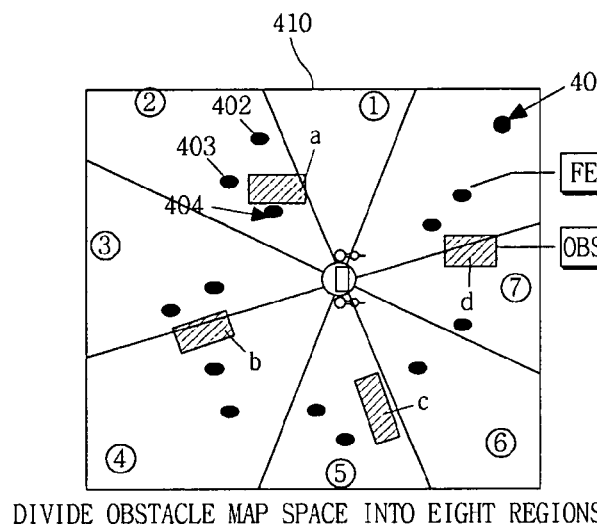
FIG. 4 illustrates a path generation method for improving the accuracy of a feature map, according to another exemplary embodiment.
Figure 4:
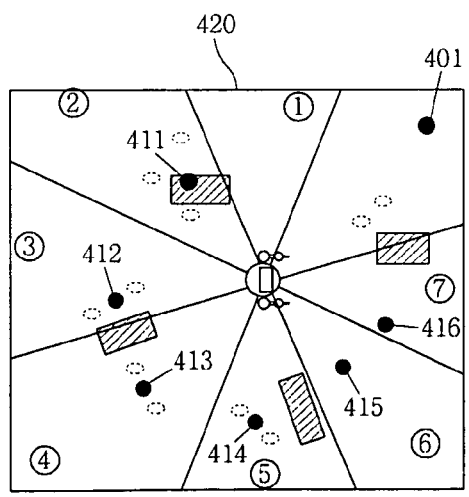
Figure 4:
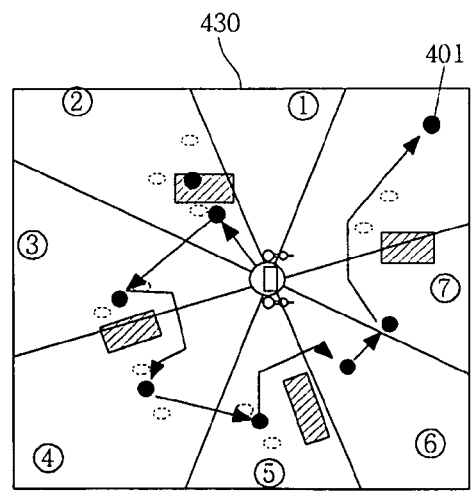

FIG. 4 illustrates a path generation method for improving the accuracy of a feature map, according to another exemplary embodiment.

FIG. 4 illustrates a method of generating a path when a plurality of features having high degrees of uncertainty exist. In a space 410, a destination 401, a plurality of features including features 402, 403 and 404, and obstacles a, b, c and d are shown. The features shown in the space 410 and including the features 402, 403 and 404 have degrees of uncertainty of a first threshold value or more.

As shown in a space 420, an obstacle map space is divided into a specific number of regions, and then the average position of the features 402, 403 and 404 included in the respective divided regions is calculated. FIG. 4 illustrates a case in which the obstacle map space is divided into eight regions.

The average position of the features 402, 403 and 404 may be calculated as indicated by a reference numeral 411, and the average positions of features in the other regions may be calculated as indicated by reference numerals 412 to 416.

A mobile robot 100 may generate an exploration path which includes the average positions 411 to 416 as intermediate path points and extends from the current position to the destination 401 as shown in a space 430. Here, since the average position 411 of features overlaps an obstacle, a path for avoiding the obstacle may be generated as shown in the space 430. To generate the path for avoiding the obstacle, an obstacle avoidance path generation algorithm, such as an A-star algorithm, may be used.

Figure 5:
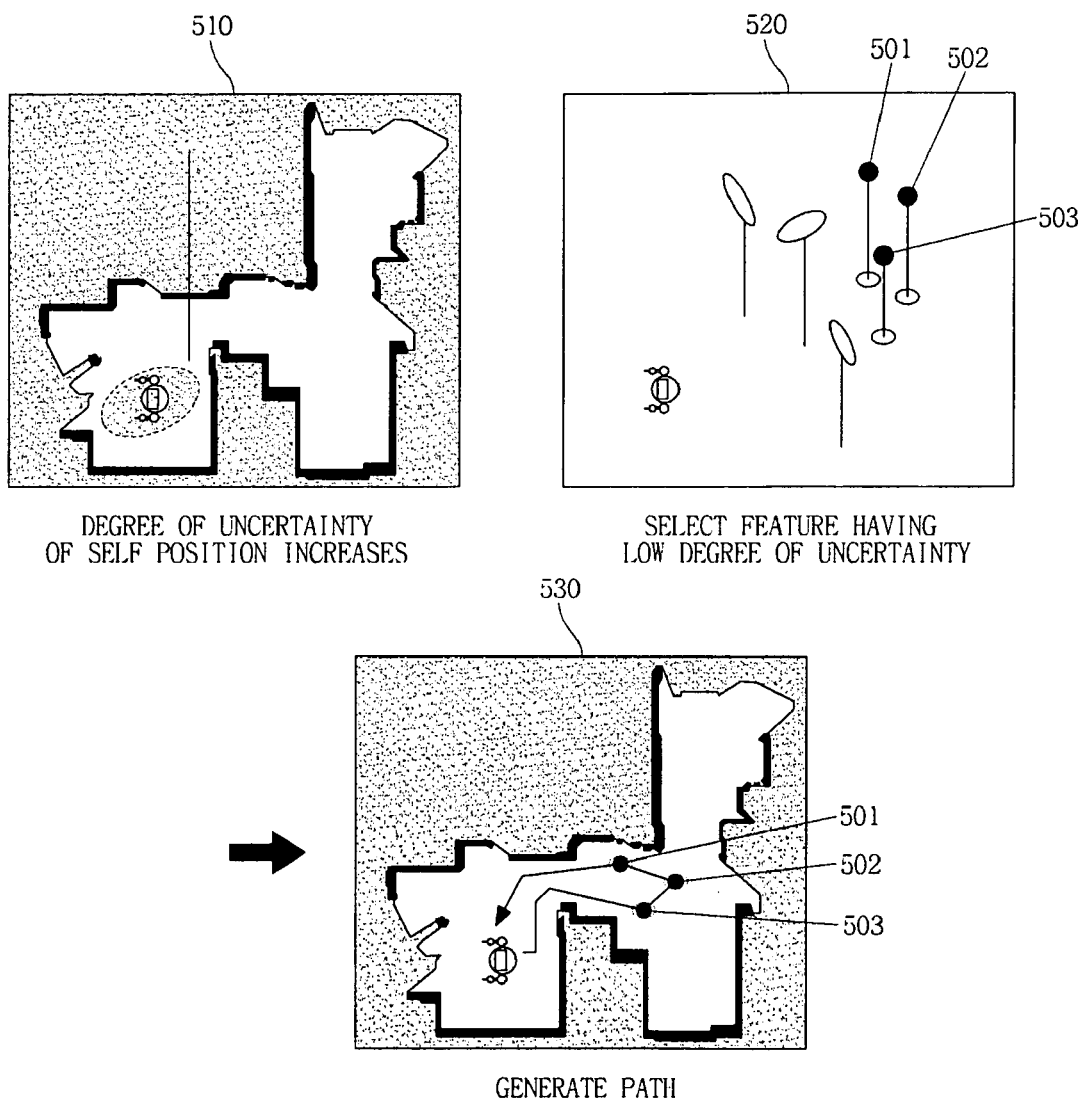
FIG. 5 illustrates a path generation method for improving the accuracy of the position of a mobile robot, according to an exemplary embodiment.

FIG. 5 illustrates a path generation method for improving the accuracy of the position of a mobile robot according to an exemplary embodiment.

When it is determined that the degree of uncertainty of the position of a mobile robot 100 is larger than a second threshold value as shown in a space 510, the mobile robot 100 building a map searches for features 501, 502 and 503 having a smaller degree of uncertainty than a third threshold value and travels to the position of the feature 501, 502 or 503 as shown in a space 520, thereby reducing the degree of uncertainty of its own position. When the Kalman filter is used to estimate the current position of the mobile robot 100, the degree of uncertainty of the current position may be obtained using the covariance of the estimated current position. Then, as shown in a space 530, a closed path which includes the searched features 501, 502 and 503 as intermediate path points and the current position as a destination may be generated. When the mobile robot 100 travels along the path, features having high accuracy are detected again. As a result, the degree of uncertainty of the position of the mobile robot 100 can be reduced, and the mobile robot 100 can accurately localize itself.

In this exemplary embodiment, when it is determined that the degree of uncertainty of the position of a mobile robot is high, the mobile robot generates a path passing through features having a low degree of uncertainty and travels along the path, thereby reducing the degree of uncertainty of its position. In other words, in unknown surroundings, a mobile robot increases the accuracy of its position and thus can accurately build a feature map and an obstacle map and generate an accurate moving path for autonomous navigation.

Figure 6:
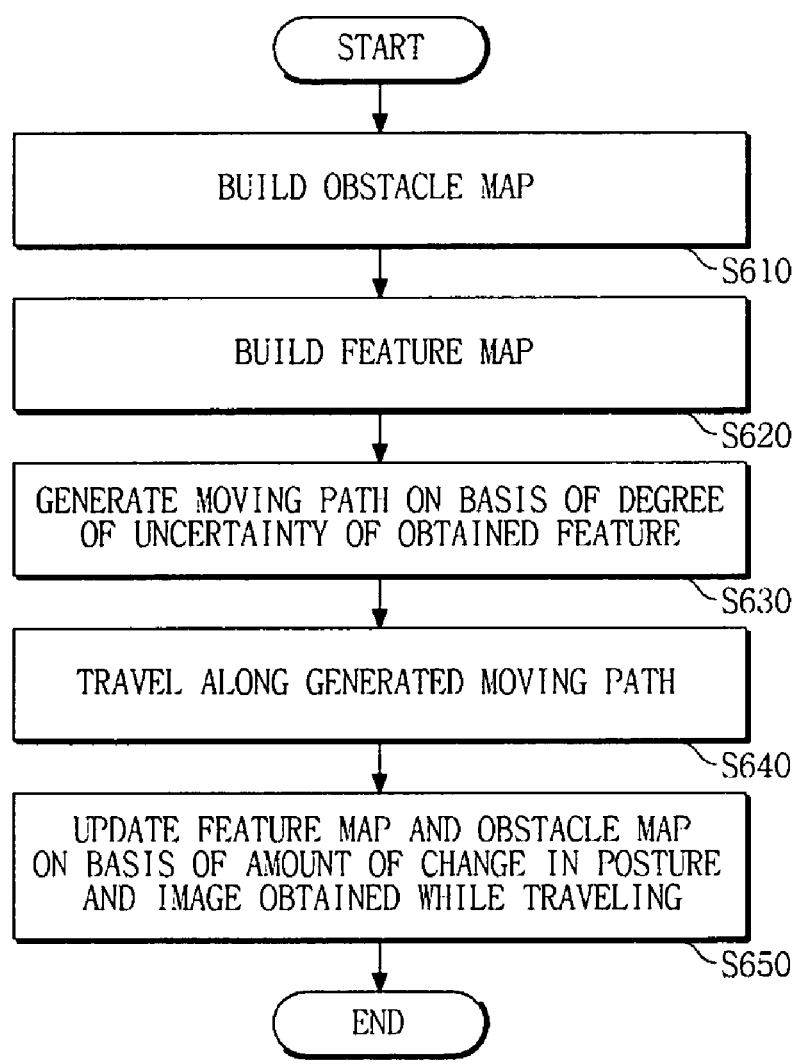
FIG. 6 illustrates a method of building a map, according to an exemplary embodiment.

FIG. 6 illustrates a method of building a map, according to an exemplary embodiment.

A mobile robot 100 starts building an obstacle map (S610). The mobile robot 100 sets a destination on the basis of the obstacle map, and then builds a feature map including a plurality of features, position information of the respective features, and information regarding degrees of uncertainty of the respective features on the basis of the amount of change in posture and images obtained according to a moving path while the mobile robot 100 travels to the set destination (S620). The step of building an obstacle map (S610) and the step of building a feature map (S620) are not performed in sequence. Rather, the mobile robot 100 simultaneously builds an obstacle map and a feature map required to generate a path.

The mobile robot 100 generates a moving path on the basis of the degrees of uncertainty of the obtained features (S630), and travels along the generated moving path (S640).

On the basis of the amount of change in posture, images, and obstacle detection information obtained while the mobile robot 100 travels along the generated moving path, the obstacle map which has been built since step 610 and the feature map which has been built since step 620 are updated (S650). The step of updating the feature map and the obstacle map (S650) is not performed when the mobile robot 100 completes the travel along the moving path. Rather, while the mobile robot 100 is traveling, information, including for example images, the amount of change in posture, obstacle detection information, etc., may be obtained and simultaneously reflected in the obstacle map and feature map being built.

Figure 7:
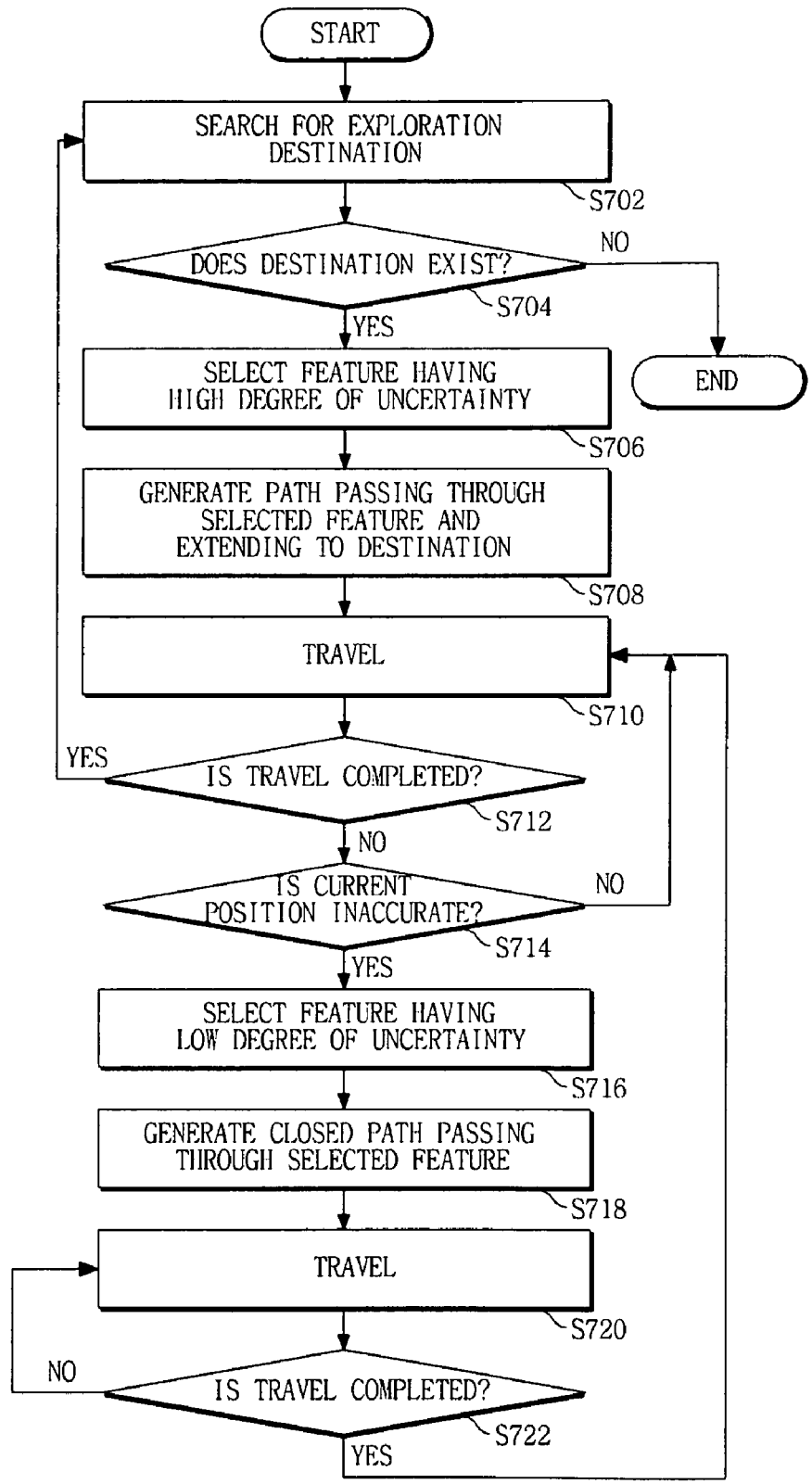
FIG. 7 illustrates a method of generating a path and traveling along the path, according to an exemplary embodiment.

FIG. 7 illustrates a method of generating a path and traveling along the path, according to an exemplary embodiment.

A mobile robot 100 searches for an exploration destination (S702). The destination may be one point between an unknown region and an empty region having no obstacles in an obstacle map being built. When it is determined in step 704 that there is a destination, an exploration path generation step is performed.

To generate an exploration path, the mobile robot 100 selects features having a high degree of uncertainty (S706). The mobile robot 100 generates a path which passes through the selected features and extends to the destination (S708). After, the mobile robot 100 travels along the generated path to arrive at the destination (S710). While the mobile robot 100 is traveling as described above, an obstacle map and a feature map are continuously built. Using feature information obtained while the mobile robot 100 travels along the path, the feature map is updated, and the obstacle map may be built and corrected on the basis of the updated feature map.

When it is determined in step 712 that the travel along the exploration path is completed, the process returns to the exploration destination search step (S702) to search for a new destination and generate a moving path.

Meanwhile, when it is determined in step 712 that the travel along the exploration path is underway, it is determined whether or not a current position is accurate, that is, whether or not the degree of uncertainty of the current position of the mobile robot 100 is a specific threshold value or less until the travel to the exploration destination is completed (S714). When it is determined in step 714 that the current position of the mobile robot 100 is accurate, the mobile robot 100 continues traveling to the destination along the generated moving path (S710), and thus continues building and correcting the obstacle map and the feature map. When it is determined in step 714 that the current position of the mobile robot 100 is inaccurate, that is, the degree of uncertainty of the current position of the mobile robot 100 is larger than the specific threshold value, the mobile robot 100 may stop traveling along the path to the destination generated in step 708, and a process of generating a path for more accurately localizing the mobile robot 100 itself may be performed.

To more accurately localize the mobile robot 100 itself, the mobile robot 100 selects features having a low degree of uncertainty (S716), and generates a closed path which passes through the selected features and has the current position determined to be inaccurate as a destination (S718). After, the mobile robot 100 travels along the generated self-localization enhancement path (S720). When it is determined in step 722 that the travel along the generated self-localization enhancement path is completed, the mobile robot 100 continues traveling along the exploration path to the destination generated in step 708 (S710).

The above-mentioned method according to the present embodiment of the invention may be implemented using computer readable code stored in any form of recording media, such as CD-ROM, RAM, ROM, floppy disk, hard disk, or magneto-optical disk, or in any computer-readable form, such as computer code organized into executable programs.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for building a map, the apparatus comprising:
    an obstacle map builder to build an obstacle map on the basis of obtained obstacle detection information;
    a controller to build a feature map including a plurality of features, position information of the features, and information regarding degrees of uncertainty of the features on the basis of an amount of change in posture and an image obtained while a mobile robot moves, and localizing the mobile robot itself;
    a path generator to generate a moving path on the basis of the degrees of uncertainty of the features obtained by the mobile robot, wherein the path generator selectively generates the moving path from among a plurality of moving paths including an exploration path for reducing the degrees of uncertainty of the features and a self-localization enhancement path for reducing a degree of uncertainty of a position of the mobile robot, wherein the exploration path and the self-localization enhancement path are generated on the basis of the degrees of uncertainty of the features; and
    a drive controller to control the mobile robot to travel along the generated moving path,
    wherein the feature map and the obstacle map are updated on the basis of the amount of change in posture, the image, and the obstacle detection information obtained while the mobile robot travels along the generated moving path.

2. The apparatus of claim 1, wherein a destination is a point between an unknown region and an empty region having no obstacles in the obstacle map being built.

3. The apparatus of claim 1, wherein when there are a plurality of features having a degree of uncertainty of a first threshold value or more among the features, the path generator divides a space in which the features having a degree of uncertainty of the first threshold value or more exist into two or more spaces and generates the exploration path including average positions of the features existing in the respective divided spaces as intermediate path points and extending from a current position to the destination.

4. The apparatus of claim 1, wherein when a Kalman filter is used to estimate positions of the features, the controller calculates the degrees of uncertainty of the features using an error covariance matrix.

5. The apparatus of claim 1, wherein the controller extracts features from an image obtained while the mobile robot travels along the exploration path, searches the feature map for features matching the extracted features, and updates position information of the searched features.

6. The apparatus of claim 1, wherein when a degree of uncertainty of a position of the mobile robot is a second threshold value or more while the mobile robot travels along the exploration path, the path generator stops the exploration path travel, generates the self-localization enhancement path for reducing a degree of uncertainty of a position of the mobile robot, controls the drive controller such that the mobile robot travels along the self-localization enhancement path, and controls the drive controller such that the mobile robot resumes the stopped exploration path travel when the mobile robot travels along the self-localization enhancement path and a degree of uncertainty of a position of the mobile robot decreases.

7. The apparatus of claim 1, wherein when it is determined that a degree of uncertainty of a current position of the mobile robot is a second threshold value or more, the path generator searches for features having a smaller degree of uncertainty than a third threshold value and generates a closed path, as the self-localization enhancement path, including positions of the searched features as intermediate path points and having the current position as a destination.

8. The apparatus of claim 7, wherein when a Kalman filter is used to estimate the current position of the mobile robot, the controller calculates the degree of uncertainty of the current position using a covariance of the estimated current position.

9. The apparatus of claim 7, wherein when a particle filter is used to estimate the current position of the mobile robot, the controller calculates variances of particles, which are samples indicating virtual positions of the mobile robot, with respect to an average position of the particles and calculates the degree of uncertainty of the current position of the mobile robot on the basis of the calculated variances.

10. The apparatus of claim 7, wherein the controller updates the current position using position information obtained while the mobile robot travels along the closed path.

11. An apparatus for building a map, the apparatus comprising:
an obstacle map builder to build an obstacle map on the basis of obtained obstacle detection information;
a controller to build a feature map including a plurality of features, position information of the features, and information regarding degrees of uncertainty of the features on the basis of an amount of change in posture of a mobile robot and an image obtained while the mobile robot moves, and localizing the mobile robot itself;
a path generator to generate a moving path on the basis of the degrees of uncertainty of the features obtained by the mobile robot for reducing the degree of uncertainty of the features by searching for features having a degree of uncertainty that meets or exceeds a first threshold value among the features, and to generate the moving path to include positions of the searched features as intermediate path points, the generated moving path extending from a current position to a destination; and
a drive controller to control the mobile robot to travel along the generated moving path,
wherein the feature map and the obstacle map are updated on the basis of the amount of change in posture, the image and the obstacle detection information obtained while the mobile robot travels along the generated moving path.

12. A method of building a map, the method comprising:
building an obstacle map of a mobile robot on the basis of obtained obstacle detection information;
building a feature map including a plurality of features, position information of the features, and information regarding degrees of uncertainty of the features on the basis of an amount of change in posture and an image obtained while the mobile robot moves;
generating a moving path on the basis of the degrees of uncertainty of the features obtained by the mobile robot, wherein the generating of the moving path comprises selectively generating the moving path from among a plurality of moving paths including an exploration path for reducing the degrees of uncertainty of the features and a self-localization enhancement path for reducing a degree of uncertainty of a position of the mobile robot, wherein the exploration path and the self-localization enhancement path are generated on the basis of the degrees of uncertainty of the features; and
traveling along the generated moving path,
wherein the feature map and the obstacle map are updated on the basis of the amount of change in posture, the image, and the obstacle detection information obtained while the mobile robot travels along the generated moving path.

13. The method of claim 12, wherein the generating of the exploration path includes:
searching for features having a degree of uncertainty of a first threshold value or more among the features; and
generating the exploration path including positions of the searched features as intermediate path points and extending from a current position to a destination.

14. The method of claim 13, wherein the destination is a point between an unknown region and an empty region having no obstacles in the obstacle map being built.

15. The method of claim 12, wherein when a Kalman filter is used to estimate positions of the features, the degrees of uncertainty of the features are calculated using an error covariance matrix.

16. The method of claim 12, wherein the generating of the self-localization enhancement path includes:
determining whether or not a degree of uncertainty of a current position of the mobile robot is a second threshold value or more;
when it is determined that the degree of uncertainty of the current position is the second threshold value or more, searching for features having a smaller degree of uncertainty than a third threshold value; and
generating a closed path, as the self-localization enhancement path, including positions of the searched features as intermediate path points and having the current position as a destination.

17. The method of claim 16, further comprising:
traveling along the closed path,
wherein the current position is updated using position information obtained while the mobile robot travels along the closed path.

18. The method of claim 12, further comprising:
when a degree of uncertainty of a position of the mobile robot is a second threshold value or more while the mobile robot travels along the exploration path, stopping the exploration path travel;
traveling along the self-localization enhancement path and reducing a degree of uncertainty of a position of the mobile robot; and
resuming the stopped exploration path travel.

19. An apparatus for building a map, the apparatus comprising:
an obstacle map builder to build an obstacle map on the basis of obtained obstacle detection information;
a controller to build a feature map including a plurality of features, position information of the features, and information regarding degrees of uncertainty of the features on the basis of an amount of change in posture of a mobile robot and an image obtained while the mobile robot moves, and localizing the mobile robot itself;
a path generator to generate a self-localization enhancement path for reducing a degree of uncertainty of a position of the mobile robot, wherein when the degree of uncertainty of the position of the mobile robot meets or exceeds a first threshold value while the mobile robot travels along a path, the path generator stops the travel along the path, generates the self-localization enhancement path for reducing the degree of uncertainty of a position of the mobile robot, controls the drive controller such that the mobile robot travels along the self-localization enhancement path, and controls the drive controller such that the mobile robot resumes the stopped path travel when the mobile robot travels along the self-localization enhancement path and the degree of uncertainty of the position of the mobile robot has decreased; and a drive controller to control the mobile robot to travel along the generated moving path, wherein the feature map and the obstacle map are updated on the basis of the amount of change in posture, the image, and the obstacle detection information obtained while the mobile robot travels.

* * * * *